No. 843,959. PATENTED FEB. 12, 1907.
W. J. McBRIDE.
AUTOMATIC ADJUSTABLE WATER RATING AND CONTROLLING MACHINE.
APPLICATION FILED AUG. 21, 1906.
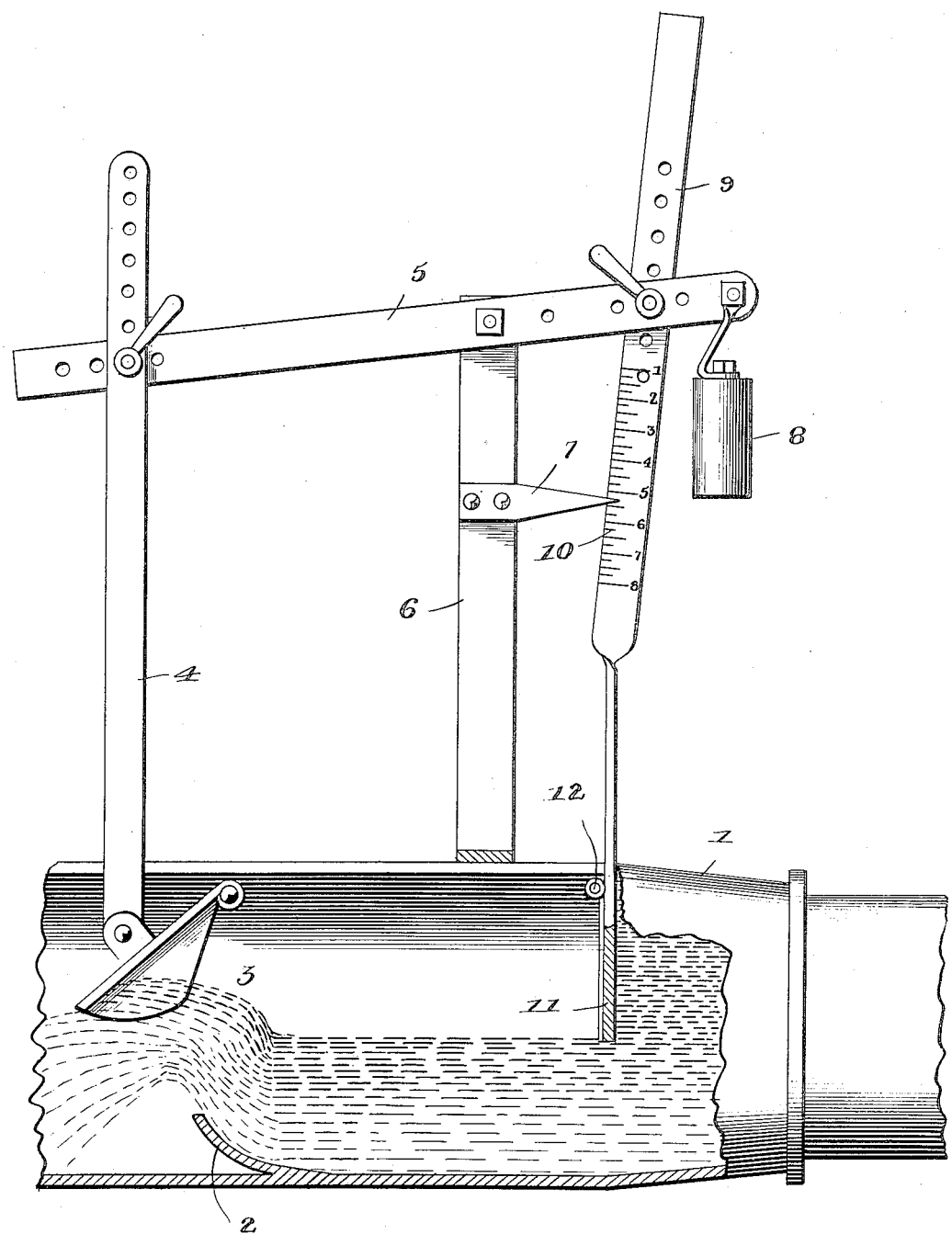
William J. McBride,
INVENTOR.
By C. A. Snow & Co.
ATTORNEYS

UNITED STATES PATENT OFFICE.

WILLIAM J. McBRIDE, OF LAS ANIMAS, COLORADO.

AUTOMATIC ADJUSTABLE WATER RATING AND CONTROLLING MACHINE.

No. 843,959.　　　　　Specification of Letters Patent.　　　　Patented Feb. 12, 1907.

Application filed August 21, 1906. Serial No. 331,492.

*To all whom it may concern:*

Be it known that I, WILLIAM J. MCBRIDE, a citizen of the United States, residing at Las Animas, in the county of Bent and State of Colorado, have invented a new and useful Automatic Adjustable Water Rating and Controlling Machine, of which the following is a specification.

This invention has relation to machines for controlling and rating the flow of water taken from a main canal for irrigation purposes, and is adapted to be used for other purposes where it is necessary or desirable to regulate, rate, and control the flow of water. The parts are so arranged that the regulation of the rate and control of the flow is automatically accomplished. The parts of the machine may be so adjusted that the said regulation of rate and control of flow is had to a predetermined degree.

In the accompanying drawing the figure represents a longitudinal sectional view of the adjustable water rating and controlling machine.

The machine consists of the casing 1, through which the water is adapted to flow. Said casing is provided in its bottom with an upwardly-inclined water-current diverter 2, said diverter being located just in advance of the outlet-valve 3. The rod 4 extends vertically through the top of the casing 1 and is fixed at its lower end to the said valve 3. The upper end of said rod 4 is adapted to be adjustably pivoted to the end of the beam 5. Said beam 5 is fulcrumed to the post 6, which is supported by the said casing 1. The post 6 is provided with indicator 7. The weight 8 is suspended from the extended end of the beam 5. The gage-rod 9 is adapted to be adjustably attached to the beam 5 on the opposite end thereof from the rod 4. The said rod 9 is provided with a series of graduations 10, which lie adjacent to the point of the indicator 7. The lower end of the rod 9 passes through the top of the casing and is provided with a gate-valve 11, which is adapted to reciprocate within the said casing 1 in such manner as to reduce or increase the capacity thereof for the passage of the water through the said casing.

The operation of the invention is as follows: The water passes through the casing 1 and strikes the diverter 2, which shunts the current and throws it with force against the valve 3. The valve 3 is thus moved vertically and carries up the rod 4. The upper end of the said rod is pivoted to the beam 5. The beam 5 is moved on its fulcrum-point. The rod 9 is correspondingly moved, and the graduations 10 are moved under the point of the indicator 7. At the same time the valve 11 is moved vertically, and the flow of water through the casing 1 is thereby regulated. It will thus be seen that the regulation of the flow of water is automatically attained and that the parts may be so set as to maintain the flow at a predetermined rate and that such rate may be varied when desired as occasion or emergencies might require. The friction-roller 12 is located in the casing 1, and the rear side of the valve 11 comes in contact therewith as the said valve reciprocates vertically.

Having described my invention, what I claim as new, and desire to secure by Letters Patent, is—

1. A device for regulating the rate and controlling the flow of liquid consisting of a casing, a valve located in said casing and adapted to be operated by the current, a rod attached to said valve and adapted to move therewith, a beam suitably fulcrumed and attached to said rod, a counterbalance-weight carried by said beam, a second rod attached to said beam, a reciprocating valve located in the casing and being attached to said second rod.

2. A device of the character described consisting of a casing, a valve located in said casing and adapted to be moved by the force of the current, a rod attached to said valve, a beam suitably fulcrumed and connected with said rod, a counterbalance-weight attached to said beam, a second rod attached to said beam and having a series of graduations, an indicator-point suitably supported and having its end associated with the said graduations, a valve located in the casing and adapted to reciprocate and being attached to said second rod.

3. A device of the character described consisting of a casing, a movable valve located in said casing and adapted to be operated by the force of the current, a diverter located in the said casing in advance of said valve and adapted to direct the current against said valve, a reciprocating valve located in the casing and being operatively connected with the first said valve whereby the flow of the current is regulated as the first said valve is operated upon by the force of the current.

4. A device of the character described consisting of a casing, a valve located in said casing and adapted to be operated by the force of the current, a rod attached to said valve, a beam suitably fulcrumed, and a means for adjustably attaching one end of said beam to the said rod, a second rod adapted to be adjustably attached to the opposite end of said beam, a counterbalance-weight attached to said beam, a reciprocating valve located within the casing and attached to said second rod.

5. A device of the character described consisting of a casing, a valve located in said casing and adapted to be operated by the force of the current, a rod attached to said valve, a beam suitably fulcrumed and being adapted to have one of its ends adjustably secured to said rod, a counterbalance-weight attached to said beam, a second rod having a series of graduations and being adapted to be adjustably attached to the opposite end of said beam, an indicator-point suitably supported and having its end associated with the graduations of the second said rod, a reciprocating valve located in the casing and being attached to the second said rod.

In testimony that I claim the foregoing as my own I have hereto affixed my signature in the presence of two witnesses.

WILLIAM J. McBRIDE.

Witnesses:
R. H. THOMPSON,
F. T. WEBBER.